United States Patent [19]
Joseph et al.

[11] Patent Number: 4,903,722
[45] Date of Patent: Feb. 27, 1990

[54] EXTRACTION VALVE HEAD FOR TANKS

[75] Inventors: Frank Joseph, Gernsheim; Holger Jürgensen, Aachen, both of Fed. Rep. of Germany

[73] Assignee: Merck Patent Gesellschaft mit Beschraenkter Haftung, Darmstadt, Fed. Rep. of Germany

[21] Appl. No.: 330,501

[22] Filed: Mar. 30, 1989

[30] Foreign Application Priority Data
Mar. 31, 1988 [DE] Fed. Rep. of Germany ....... 3811041

[51] Int. Cl.⁴ ............................................. F16K 11/00
[52] U.S. Cl. .................................. 137/209; 137/599.1
[58] Field of Search ................. 137/209, 599, 599.1, 137/884

[56] References Cited
U.S. PATENT DOCUMENTS

| | | | |
|---|---|---|---|
| 4,006,205 | 2/1977 | Etter | 137/209 X |
| 4,622,988 | 11/1986 | Tahimoto et al. | 137/209 |
| 4,657,048 | 4/1987 | Foster | 137/884 |
| 4,711,268 | 12/1987 | Coleman | 137/597 |
| 4,714,091 | 12/1987 | Wagner | 137/271 X |

Primary Examiner—John Fox
Attorney, Agent, or Firm—Millen, White & Zelano

[57] ABSTRACT

An extraction valve head for a tank for high-purity and/or toxic liquid chemicals has an inlet valve for a filler gas, an outlet valve and a purging valve, which closes a bypass between a gas inlet line and an extraction line. The valves are configured as metal diaphragm valves and are fitted in a common metallic valve housing block. All valve seals of the valves are arranged in close spatial proximity to one another in the valve housing block.

7 Claims, 3 Drawing Sheets

EXTRACTION VALVE HEAD FOR TANKS

BACKGROUND OF THE INVENTION

The invention relates to an extraction valve head for a tank containing high-purity and/or toxic liquid chemicals, having an inlet valve for a filler gas, which connects a gas inlet line to a tank inlet, and an outlet valve, which connects a tank outlet to an extraction line, a bypass, which can be shut off by a purging valve, connecting the gas inlet line to the extraction line.

Tanks of steel, glass, plastic or similar materials are used for the transportation and the application of high-purity and/or toxic process chemicals. These tanks are provided with shut-off valves, which allow filling and extraction of the chemicals. These valves may be combined in an extraction valve head, which is fitted onto the tank.

Usually, the tank is fed via the gas inlet line with a filler gas, which serves to discharge liquid chemicals from the tank. The filler gas is fed either on the upper side of the tank and forces the liquid chemical through riser through the tank outlet into the extraction line or is fed via the riser extending into the liquid and takes portions of the liquid with it as it bubbles up.

It is known to purge the connected lines with a purging gas, for example the filter gas is also used for the extraction. In this approach, after closing of the inlet valve and the outlet valve, a bypass, which can be shut off by a purging valve, is opened, so that the gas can flow out of the gas inlet line into the extraction line. However, in this case unpurged dead spaces remain in the region of the inlet valve and the outlet valve.

Three-way cocks may be used as valves, in which channels which cannot be purged remain in the bores of the cock plug. In addition, with these cocks, no adequate, purely mechanical sealing is possible, as is necessary in the case of many such chemicals. Therefore, diaphragm valves are used for this purpose, in which a metal diaphragm ensures complete metallic sealing of the moveable valve parts with respect to the valve housing. However, in each case the diaphragm valves are only shut-off valves. In the purging operation, there remain in the line branches leading to the shut-off valves, unpurged dead spaces, which can only be purged by separate purging connections.

SUMMARY OF THE INVENTION

The object of the invention is to design an extraction valve head of the generic type mentioned in the background of the invention such that the valve head is free of dead spaces and complete purging of the valve head is possible without a separate purging connection.

Upon further study of the specification and appended claims, further objects and advantages of this invention will become apparent to those skilled in the art.

These objects are achieved according to the invention by configuring the inlet valve, the outlet valve and the purging valve as metal diaphragm valves fitted in a common metallic valve housing block. A valve seat for the inlet valve is arranged between the gas inlet line and the tank inlet, and a valve seat for the outlet valve is connected between the tank outlet and the extraction line. A valve seat for the purging valve is arranged between the gas inlet line and the extraction line, and all valve seats are arranged in close spatial proximity to one another in the valve housing block.

Due to the close spatial proximity of the three metal diaphragm valves acting as shut-off valves, they can also function as two three-way valves. Since the valve seats and the mouths of all connected lines lie spatially close to one another, no dead spaces remain in the purging operation when the inlet valve and the outlet valve are closed and the purging valve is open.

The use of diaphragm valves means that there are no moveable, and therefore no abrasion-generating parts on the diaphragm side facing chemicals in the vessel.

According to a preferred embodiment of the invention, the purging valve and the outlet valve are arranged in alignment with one another, their valve seats being interconnected by a short bore, from which the extraction line branches. Advantageously, a short line, which leaves the valve seat of the inlet valve and opens out into the gas inlet line, extends at right angles to the axis of the purging valve and outlet valve while being connected to the purging valve. As a result, all valve seats and the line mouths assigned with them are arranged as closely as possible to one another, so that no dead spaces occur during the purging operation.

In further development of the invention, the inlet valve, purging valve and outlet valve, each have therein a longitudinally moveable valve body which has a gas tight connection with the metal diaphragm and is sealed off with respect to a valve housing by means of an additional elastomer seal. As a result, an additional safeguard against leakage is achieved. It is particularly preferable if a space lying between the metal diaphragm and the elastomer seal is joined via a bore in the valve body to a leak-checking orifice, closed by a releasable stopper. This allows one to check at any time the tightness of the metal diaphragm without opening the valve and without the medium being used for the tightness test getting into the product lines of the extraction valve head.

Further advantageous developments of the inventive idea are the subject of further subclaims.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION OF THE DRAWINGS

Figure 1:
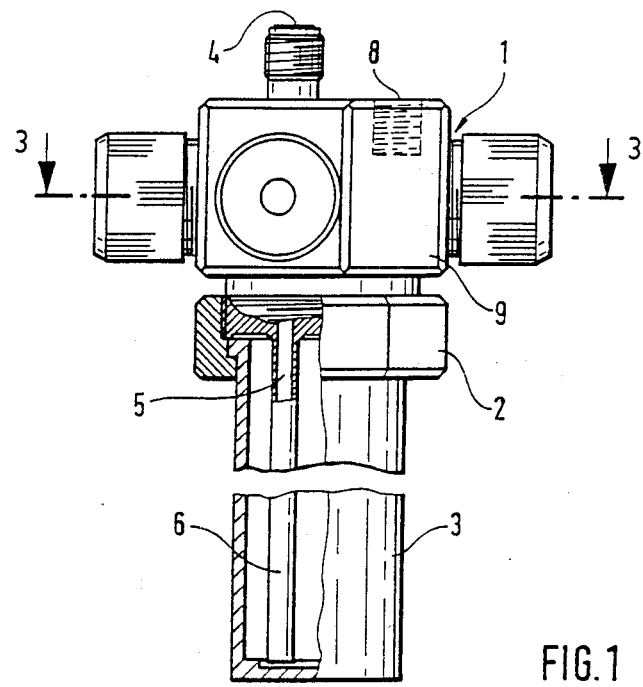
FIG. 1 is a side view in partial section of an extraction valve head, which is fitted onto a tank for containing high-purity and/or toxic liquid chemicals.

The extraction valve head 1 shown in FIG. 1 is connected by means of a union nut 2, as a screwed connection, to a tank 3, from which high-purity and/or toxic liquid chemicals are to be extracted.

A filler gas, which passes into the tank 3 via a tank inlet 5 and a dip tube 6 which is gap-free connected to the valve head by an orbital weld technique, is fed via a gas inlet line 4. The filler gas, charged with parts of the liquid chemical, passes out of a tank outlet 7 to an extraction line 8, through which it is transported for further processing.

Figure 2:
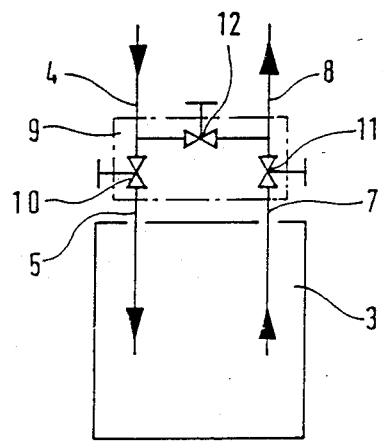
FIG. 2 is a diagram of the operation extraction valve head according to FIG. 1.
Figure 3:
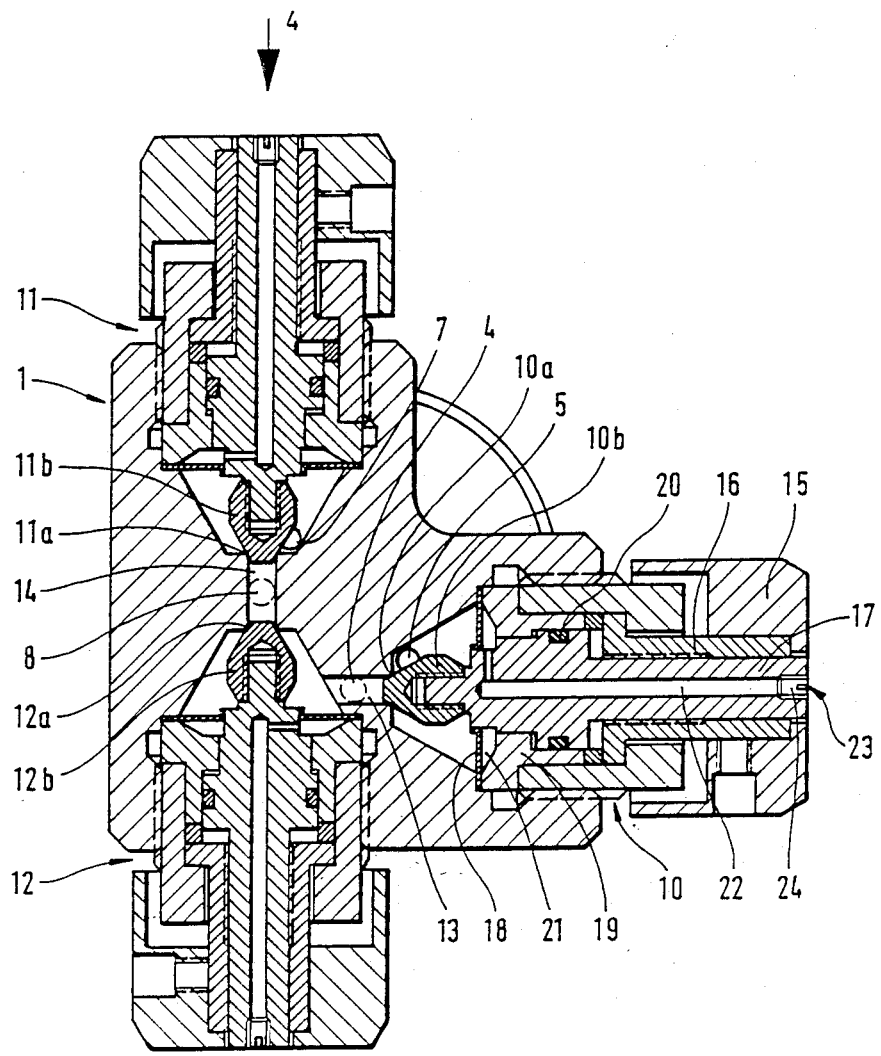
FIG. 3 is an enlarged section along line III—III in FIG. 1.

As shown in FIG. 2, in a diagrammatic representation and in FIG. 3, in a horizontal section, an inlet valve 10, an outlet valve 11 and a purging valve 12 are arranged in a valve housing block 9, which consists integrally of a metal block that includes therein all line connections. Each of the valves 10, 11 and 12 is a shut-off valve which is made as a metal diaphragm valve and will be explained later in further detail. Each valve 10, 11 and 12 is assigned a corresponding valve seat 10a, 11a and 12a in the valve housing block. Each valve closes the assigned valve seat 10a, 11a and 12a by a moveable valve closing body 10b, 11b and 12b, respectively.

During the extraction operation, the purging valve 12 is closed and the inlet valve 10 and the outlet valve 11 are open. For the purging operation, the inlet valve 10 and the outlet valve 11 are closed and the purging valve 12 is opened.

As FIG. 3 shows, all valve seats 10a, 11a and 12a, as well as all line mouths, are arranged in such close spatial proximity to one another that no dead spaces remain in the purging operation.

The valve seat 10a of the inlet valve 10 lies between the tank inlet 5 and the gas inlet line 4, which opens out into a short bore 13 directly in front of the valve seat 10a. The short bore 13 is connected to the purging valve 12, so that the valve seat 12a lies between the short bore 13 and a further short bore 14 which extends at right angles thereto and into which the extraction line 8 opens. The valve seat 11a of the outlet valve 11 lies between the mouth of the extraction line 8 and of the tank outlet 7.

The axes of the outlet valve 11 and of the purging valve 12 are aligned with each other; the axis of the inlet valve 10 extends at right angles thereto.

When, during the extraction operation, the purging valve 12 is closed, the filler gas flows out of the gas inlet line 4 into the tank inlet 5, through the tank 3 and enters through the tank outlet 7 back into the extraction valve head 1, and leaves through the extraction line 8. When the inlet valve 10 and the outlet valve 11 are closed for the purging operation, the tank 3 is separated from the line system 4, 8. By opening of the purging valve 12, a bypass is established, which makes the purging operation possible. The gas used for the purging then flows through the gas inlet line 4 via the open valve seat 12a into the extraction line 8. Since the mouths of these two lines 4 and 8 lie closely in front of the neighboring closed valve seats 10a and 11a, no unpurged dead spaces remain.

The valve inserts of the inlet valve 10, of the outlet valve 11 and of the purging valve 12 are of identical design and have in each case a valve body which is longitudinally moveable by means of a hand wheel 15 via a thread 16 and is welded gas tight at its front end to a metal diaphragm 18. The valve body 17 bears at its front end the valve closing body 10b, 11b and 12b, respectively.

The valve body 17 is guided longitudinally in a valve housing 19 and is additionally sealed off by means of an elastomer seal 10. A space 21 lying between the metal diaphragm 18 and the elastomer seal 20 is in connection, via a bore 22 in the valve body 17, with a leak-checking orifice 23, which in normal operation may be closed by a releasable stopper 24. By this bore 22, a leak test of the metal diaphragm 18 can be carried out at any time. To conduct this test, a pressurized gas is fed to the space 21. If the pressure applied is maintained, the metal diaphragm 18 is tight, and no gas used for the leak test can get into the product spaces of the extraction valve head 1.

Since the outlet valve 11 and the purging valve 12 are of an identical design to the inlet valve 10, only the inlet valve 10 was described here in detail.

Figure 4:
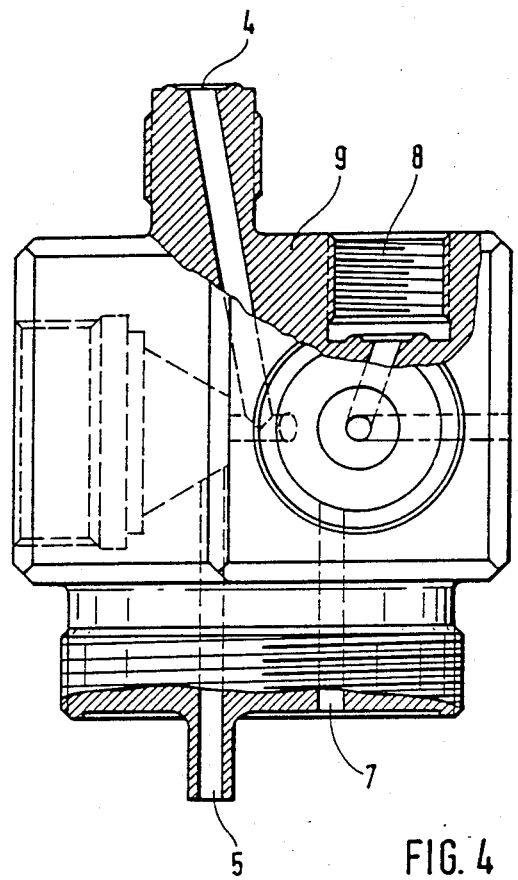
FIG. 4 is a view, partially in section, of the valve housing block taken in the direction of arrow IV of FIG. 3, the valve inserts being omitted.

FIG. 4 shows the valve housing block 9, which is fabricated integrally from a metal block. Evident in particular are the bore path of the gas inlet line 4, of the extraction line 8 and of the tank inlet 5 as well as of the tank outlet 7. In order to eliminate with certainty any confusion of the connections, the screw connection for the gas inlet line 4 is made with external thread and the screw connection for the extraction line 8 with internal thread.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An extraction valve head for a tank (3) used for containing high-purity and/or toxic liquid chemicals, the valve head having an inlet valve for a filler gas, which joins a gas inlet line and a tank inlet, and an outlet valve, which joins a tank outlet to an extraction line, a bypass, which can be shut off by a purging valve, connecting the gas inlet line to the extraction line;

wherein the inlet valve (1), the outlet valve (11) and the purging valve (12) are metal diaphragm valves and are fitted in a common metallic valve housing block; wherein a valve seat (10a) for the inlet valve (10) is arranged between the gas inlet line (4) and the tank inlet (5);

wherein a valve seat (11a) for the outlet valve (11) is arranged between the tank outlet (7) and the extraction line (8);

wherein a valve seat (12a) for the purging valve (12) is arranged between the gas inlet line (4) and the extraction line (8); and wherein all valve seats (10a, 11a, 12a) are arranged in close spatial proximity to one another in the valve housing block (9).

2. The extraction valve head according to claim 1, wherein the purging valve (12) and the outlet valve (11) are in alignment with one another, the valve seats (12a and 11a, respectively) thereof being interconnected by a short bore (14), with which the extraction line (8) is connected.

3. The extraction valve head according to claim 2, wherein a short bore (13) proximate the valve seat (10a) of the inlet valve (10) opens out into the gas inlet line (4), extends at right angles with respect to both the axis of the purging valve (12) and the outlet valve (11), and is connected to the purging valve (12).

4. The extraction valve head according to claim 1, wherein in the inlet valve (1), purging valve (12) and outlet valve (11), a longitudinally moveable valve body (17) is connected gas-tight to a metal diaphragm (18) and is sealed from a valve housing (19) by means of an additional elastomer seal (20).

5. The extraction valve head according to claim 4, wherein a space (21) positioned between the metal diaphragm (18) and the elastomer seal (20) is connected via a bore (22) in the valve body (17) to a leak-checking orifice (23), closed by a releasable stopper (24).

6. The extraction valve head according to claim 1, wherein the valve housing block (9) consists integrally of a metal block which has formed therein all interconnections between hoses and valves and which is completely polished electrochemically.

7. The extraction valve head according to claim 1, wherein the valve housing block (9) has a screw coupling (2) for direct connection to the tank (3) which screw coupling (2) makes possible the dismounting of the tank (3) and valve housing block (9).

* * * * *